No. 664,663. Patented Dec. 25, 1900.
M. G. MITCHELL.
REPLANTER ATTACHMENT FOR CULTIVATORS.
(Application filed Mar. 20, 1899.)
(No Model.) 2 Sheets—Sheet 2.
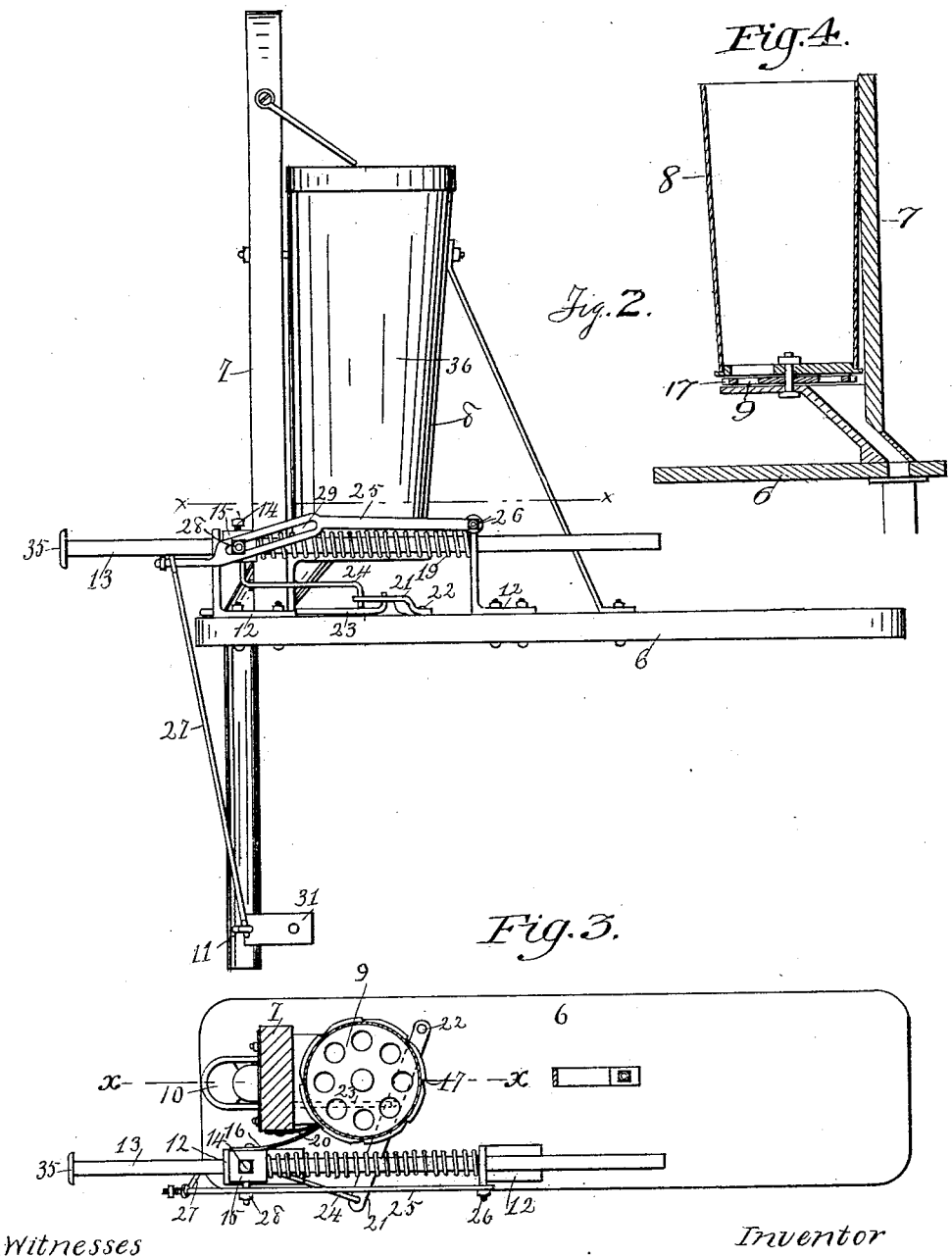

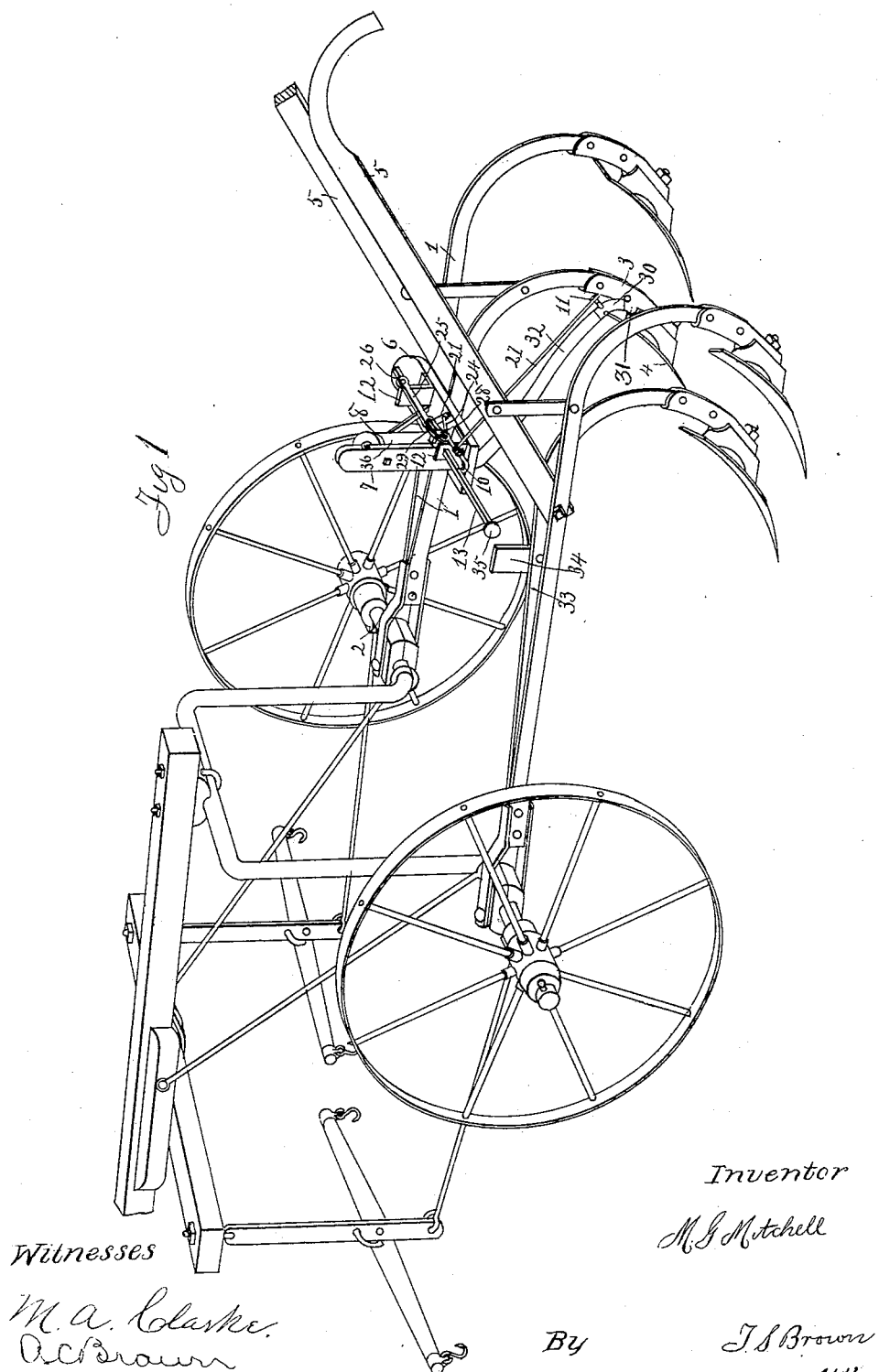

UNITED STATES PATENT OFFICE.

MILLARD G. MITCHELL, OF ARCADIA, KANSAS.

REPLANTER ATTACHMENT FOR CULTIVATORS.

SPECIFICATION forming part of Letters Patent No. 664,663, dated December 25, 1900.

Application filed March 20, 1899. Serial No. 709,707. (No model.)

*To all whom it may concern:*

Be it known that I, MILLARD G. MITCHELL, a citizen of the United States, residing at Arcadia, in the county of Crawford, in the State of Kansas, have invented a certain new and useful Replanter Attachment for Cultivators, of which the following is a full, clear, and exact description, reference being had to the accompanying drawings, which form a part of this specification.

My invention relates to a certain new and useful replanter attachment for cultivators, it being observed and recognized that in the first time going over a piece of corn with the cultivator certain hills of the corn will be missing—sometimes but few and sometimes large numbers—which it is necessary to replant—that is, to again plant such hills—that in the final stand of the corn there may not be left waste patches over the field. This is usually done as a separate operation by means of a hand-planter, involving quite a tedious and laborious operation. To avoid this tedious and laborious work of going over the field with a hand-planter to replant the missing hills of corn, I provide a planter adapted and arranged to be secured upon the cultivator and to be operated thereby, so that as the corn is gone over with the cultivator the first time these missing hills may be replanted and much time and labor thus saved; and to accomplish this object my invention consists of certain features of novelty hereinafter described, and pointed out in the claims.

Figure 1 represents a perspective view of a walking-cultivator provided with my replanter attachment. Fig. 2 represents a detail view of my replanter attachment. Fig. 3 represents a plan view of the same, partly in cross-section, on the line X X of Fig. 2. Fig. 4 represents a cross-section of the hopper on the line X X of Fig. 3.

Similar numerals refer to similar parts throughout the several views.

1 represents the plow-beams of a cultivator connected with the axle 2 in the usual manner.

3 represents the shank, and 4 the plow, of the cultivator running next the corn-row, and 5 represents the handles of a walking-cultivator.

Upon the beams 1 I secure the plate 6, provided at its inner end with a vertical standard 7, and upon this I mount a hopper 8, of any usual hand-planter pattern, having a dropper-disk 9, as shown in Fig. 3, a stop 10, and a fly-valve 11, acting as a secondary dropper, as is usual in such planters and being of familiar construction are not shown in detail. To operate this mechanism when mounted upon the cultivator, as above stated, upon the plate 6 I secure the brackets 12, in which is slidingly mounted the operating-rod 13, on which is adjustably secured, by means of the set-bolt 14, the head-block 15. Upon said head-block is secured a spring-pawl 16, arranged to engage the notches 17 in the periphery of the dropper-disk 9 to operate the same.

19 represents a coiled spring upon the operating-rod to restore the same to position after action, a spring stop-pawl 20, secured upon the standard 7 and arranged to engage the notches 17 of the dropper-disk 9, being provided to prevent the return of the disk under the return action of the spring-pawl 16.

To operate the stop 10, I provide a lever 21, pivotally mounted at 22 upon the plate 6 and connected with said stop by the link 23 and with the head-block 15 by the link 24.

To operate the fly-valve 11, I provide a lever pivotally mounted at 26 upon the outer bracket 12 and connected with said valve by the link 27 and operated by a stud 28 upon the head-block 15, working in an inclined slot 29 in said lever. As shown in Fig. 1, said fly-valve is mounted in a metal tube 30, which is secured to the shank of the plow by means of the usual shank-bolt passing through the bracket 31 thereon, the seed-conducting tube 32 being preferably of rubber or like material, secured to the plate 6 directly under the dropping-orifice of the planter and telescoping with the metal tube 30, the construction being similar to that of the hose and boot of the ordinary grain-drill.

In Fig. 1 the planter is shown as mounted upon the beams of the right-hand pair of plows. Upon the inner beam 33 of the left-hand pair of plows I mount a bumper-block 34, directly opposite to the end of the operating-rod, and upon the end of said operating-rod form a head 35. It is apparent, of course, that the planter may be mounted upon either the right or left pair of plows.

Now in plowing down a row of corn with the cultivator it will be observed in advance that a hill of corn is missing in the row. Then bringing the plow bearing the tube 30 into the position in the corn-row which such hill of corn should occupy and at the same time bringing the bumper-block 34 forcibly against the head of the operating-rod, said rod will be driven laterally, by which movement the lever 25 will be operated and the fly-valve 11 will be opened, dropping the corn into the moist pulverized earth immediately in the rear of the plow, where it will be covered by the fresh moist earth falling into the furrow as the plow advances. By the same movement of the operating-rod, acting through the links 23 and 24 and lever 21, the stop 10 will close the dropper-orifice and the spring-pawl 16 will operate the dropper-disk 9 to discharge from the hopper 8 the amount requisite for the next hill, which will be caught by the stop 10, until the operating-rod being released and by the action of the coiled spring returned the fly-valve is restored to position and the stop withdrawn, and the corn thereon falls upon the fly-valve in readiness for the next replant.

Having thus fully described my replanter attachment and the means for operating the same, what I claim as my invention, and desire to secure by Letters Patent, is—

1. A replanter attachment for cultivators consisting of a hopper mounted upon a suitable frame secured upon the beams of one pair of plows, a spring-actuated operating-rod slidingly mounted in brackets secured upon said frame, a head-block adjustably secured upon said rod, a spring-pawl secured to said head-block arranged to engage the notched periphery of the dropper-disk of said hopper, a lever mounted upon said frame, links connecting said lever with said head-block and with the stop-valve of said planter for operating said stop, a lever fulcrumed upon one of said brackets, a link connecting said lever with the fly-valve of said planter, and a stud on said head-block operating in an inclined slot in said lever for operating said valve, and a bumper-block secured upon the inner frame of the other pair of plows for operating said operating-rod, substantially as set forth.

2. The combination with a cultivator of a hopper having a rotating dropper-disk provided with a notched periphery, a stop-valve and a fly-valve, mounted upon a frame secured upon the beams of one pair of plows, brackets mounted upon said frame, a spring-operated operating-rod slidingly mounted in said brackets, an adjustable head-block mounted on said operating-rod, a spring-pawl secured upon said head-block arranged to engage the notches in said dropper-disk, a lever mounted upon said frame, links connecting said lever with said head-block and with said stop-valve for operating said stop, a lever fulcrumed on one of said brackets, a link connecting said lever with said fly-valve, a stud on said head-block operating in an inclined slot in said lever for operating said valve, and a bumper-block on the inner beam of the other pair of plows for operating said operating-rod, substantially as set forth.

3. The combination with a cultivator of a frame secured upon the beams of one of the pairs of plows, a metal tube provided with a fly-valve secured to the shank of the inner plow of said pair, a hopper having a rotating dropper-disk provided with a notched periphery and a stop-valve, mounted upon said frame; a flexible tube secured to said frame under the opening of said stop-valve and telescoping with said shank-tube, brackets mounted upon said frame, an operating-rod slidingly mounted in said brackets, a head-block adjustably mounted upon said rod, a coiled spring on said rod, a spring-pawl secured upon said head-block arranged to engage the notches in said dropper-disk to operate the same, a lever mounted upon said frame, links connecting said lever with said head-block and with said stop-valve for operating said valve, a lever fulcrumed upon one of said brackets, a link connecting said lever with said fly-valve, a stud on said head-block operating in an inclined slot in said lever for operating said fly-valve, and means for operating said operating-rod, substantially as set forth.

4. The combination with a hopper mounted on a suitable frame, having a rotating dropper-disk provided with a notched periphery, and a stop-valve and a fly-valve, of brackets mounted on said frame, a spring-actuated operating-rod slidingly mounted in said brackets, a head-block adjustably mounted upon said rod, a spring-pawl secured upon said head-block arranged to engage said notches in said dropper-disk, to operate the same, a lever mounted upon the frame, links connecting said lever with said head-block and said stop-valve for operating said valve, a lever fulcrumed upon one of said brackets, a link connecting said lever with said fly-valve, a stud on said head-block operating in an inclined slot in said lever for operating said valve, and means for operating said operating-rod substantially as set forth.

5. The combination with a cultivator of a frame mounted upon the plow-beam, a hopper mounted on said frame, having a rotating dropper-disk provided with a notched periphery and a stop-valve, a metal tube provided with a fly-valve secured upon the shank of the inner plow, a flexible tube telescoping with said tube and secured to said frame under the opening closed by said stop-valve, brackets mounted upon said frame, a spring-actuated operating-rod slidingly mounted in said brackets, a head-block adjustably secured upon said rod, a spring-pawl secured upon said head-block arranged to engage said notches in said dropper-disk, a lever mounted on said frame, links connecting said lever with said head-block and with said stop-valve for operating said valve, a lever fulcrumed on one of said brackets, a link connecting said lever with said fly-valve, and a stud on said head-block operating in an inclined slot in said lever for operating said valve, substantially as set forth.

MILLARD G. MITCHELL.

Witnesses:
W. D. KONANTZ,
G. W. BROOKS.